(12) United States Patent
Khojastepour et al.

(10) Patent No.: US 8,537,914 B2
(45) Date of Patent: *Sep. 17, 2013

(54) MULTI-RESOLUTION PRECODING CODEBOOK

(75) Inventors: Mohammad Ali Khojastepour, North Brunswick, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,308

(22) Filed: Apr. 4, 2012

(65) Prior Publication Data

US 2012/0224649 A1    Sep. 6, 2012

Related U.S. Application Data

(62) Division of application No. 12/388,485, filed on Feb. 18, 2009, now Pat. No. 8,199,836.

(60) Provisional application No. 61/049,823, filed on May 2, 2008.

(51) Int. Cl.
*H04L 27/28*    (2006.01)

(52) U.S. Cl.
USPC ........... 375/260; 375/316; 375/295; 375/259; 375/346; 375/219; 375/221; 455/561

(58) Field of Classification Search
USPC ............... 375/316, 295, 259, 260, 346, 219, 375/221; 455/561
See application file for complete search history.

(56) References Cited

U.S. PATENT DOCUMENTS

| | | | |
|---|---|---|---|
| 8,199,836 B2 * | 6/2012 | Khojastepour et al. | 375/260 |
| 2009/0086842 A1 * | 4/2009 | Shi et al. | 375/267 |
| 2012/0057643 A1 * | 3/2012 | Lin et al. | 375/267 |
| 2013/0094453 A1 * | 4/2013 | Khojastepour et al. | 370/329 |

* cited by examiner

*Primary Examiner* — Siu Lee
(74) *Attorney, Agent, or Firm* — Joseph Kolodka

(57) ABSTRACT

Systems and methods are for generating a codebook by: generating a multi-resolution codebook by selecting a common precoder index from a low resolution codebook for a group of adjacent resource blocks (RB)s and for each RB within the group, selecting a high-resolution codebook to fine-tune each RB precoder; and generating feedback for the multi-resolution codebook by quantizing channel state variations.

18 Claims, 11 Drawing Sheets

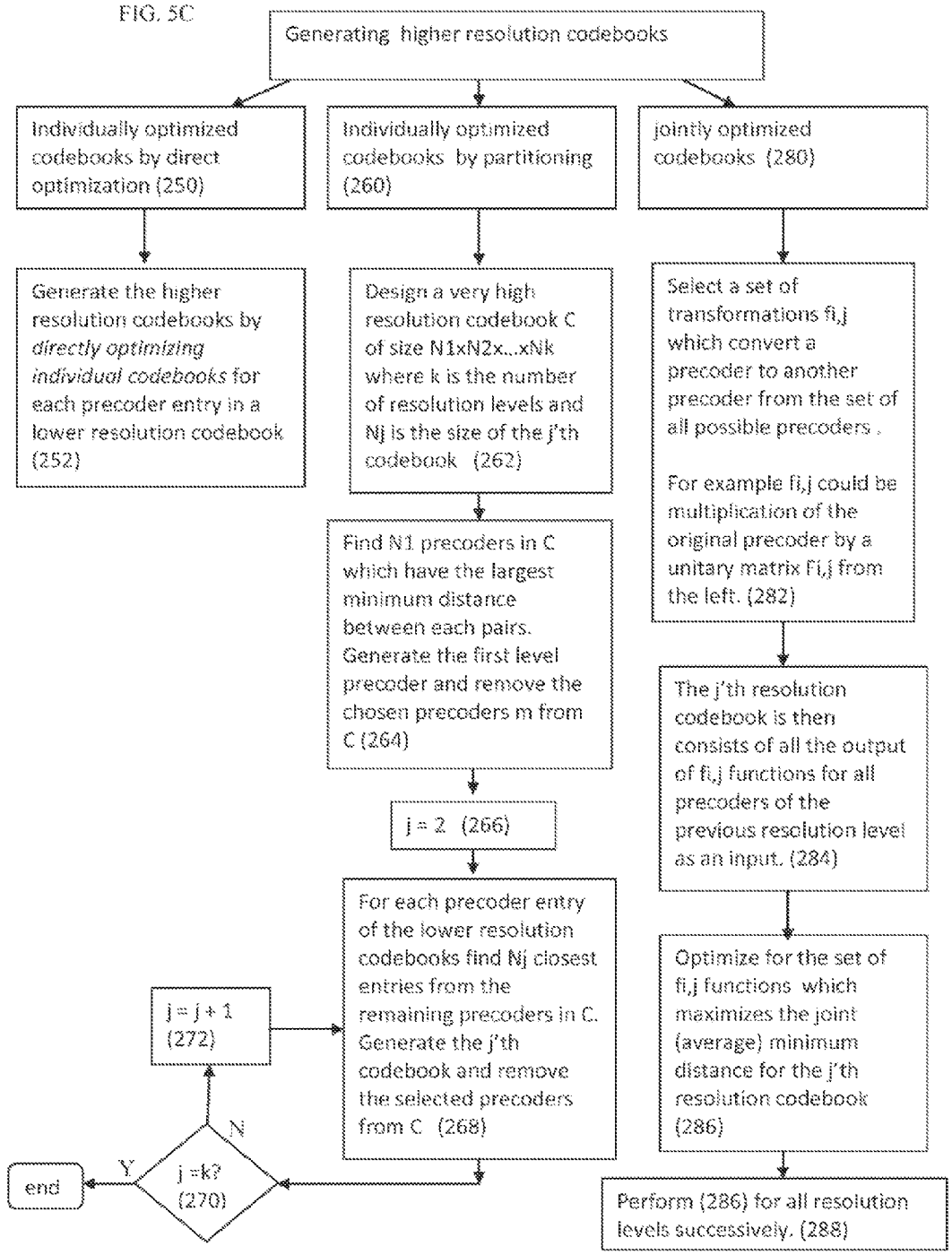

MULTI-RESOLUTION PRECODING CODEBOOK

This application is a divisional of co-pending U.S. patent application Ser. No. 12/388,485, filed on Feb. 18, 2009, which claims priority to U.S. Provisional Application Ser. No. 61/049,823, filed May 2, 2008, the content of which is incorporated by reference.

The present invention relates to the codebooks used in wireless communications.

BACKGROUND

The next generation wireless communication systems demand for even higher spectral efficiencies to accommodate the higher throughput requirements within the limited frequency bands. Multiple antenna (MIMO) systems and in particular closed loop transmission technologies such as beamforming and precoding have been vastly considered to improve the spectral efficiency. In MIMO precoding schemes, the transmitted data is divided into several independent streams where each streams is individually precoded and all precoded streams are superimposed before transmission. The number of transmitted streams is called transmission rank. The transmission rank can be optimally chosen for a given channel realization by considering the transmit power and the overall channel statistics. For each stream the precoder is a beamforming vector which consists of a set of weights, one for each antenna, that are multiplied with the transmitted symbol prior to the transmission.

The precoder of rank r is then a matrix consists of r beamforming vectors as its columns. Generally, the average transmit power is divided equally between all streams, thus, the norm of all beamforming vectors are equal and normalized to one. Furthermore, due to the superposition of the transmitted streams, the beamforming vectors are chosen to be orthogonal for simplicity of the decoding. As a result, the precoder is generally a semi-unitary matrix ($V_{n \times r}$, $r \leq n$ is called semi-unitary if and only if $V^H V = I$).

In codebook based precoding strategies, a predetermined codebook will be made available to the transmitter, i.e., Base Station (BS), and all receivers, i.e., Mobile Stations (MS). The receiver will then choose a precoder from the codebook which maximizes its performance (e.g. its data rate) and feeds back the precoder index. The selection of precoder rank should also be included in the precoder selection algorithm. The feedback rate may vary from a short-term feedback once every coherent time interval to a long-term feedback once every several coherent time intervals.

In many systems, the optimal precoders from the codebook for two adjacent transmission blocks are close with respect to a proper distance measure in the set of all possible precoders. Here, the adjacent blocks may be considered in time or in frequency, e.g., over the set of tones in OFDM systems since in practical systems the channel does not change abruptly from one transmission block to the adjacent one. Thus, the precoder used in those blocks should be equal if the channel is pretty steady and the codebook resolution is not two high. By increasing the codebook resolution or having a more dynamic channel, the precoders of the adjacent blocks are not equal anymore, yet, they might be close. The closeness between two precoders can be measured based on a proper distance metric in the space of all such precoders.

SUMMARY

Systems and methods are for generating a codebook by: generating a multi-resolution codebook by selecting a common precoder index from a low resolution codebook for a group of adjacent resource blocks (RB)s and for each RB within the group, selecting a high-resolution codebook to fine-tune each RB precoder; and generating feedback for the multi-resolution codebook by quantizing channel state variations.

In one aspect, a method for generating a codebook includes generating a multi-resolution codebook including codebooks that successively add to the codebook resolution; using the multi-resolution codebook to perform feedback based precoding by selecting a common precoder index from a low resolution codebook for a group of adjacent resource blocks (RB)s; for each RB within the group, selecting an index from the high-resolution codebook to fine-tune each RB precoder; and generating feedback based on the multi-resolution codebook by quantizing variations in a channel.

In another aspect, a communication system includes a base station having a processor adapted to generate a multi-resolution codebook by selecting a common precoder index from a low resolution codebook for a group of adjacent resource blocks (RB)s and for each RB within the group, select a high-resolution codebook to fine-tune each RB precoder; and to generate feedback for the multi-resolution codebook by quantizing state variations in a channel; and one or more wireless devices communicating with the base station using the multi-resolution codebook.

Advantages of the above system may include one or more of the following. The system reduces feedback data transmission as feedback is communicated for only the variation in the channel, since typically quantizing the channel variations requires a smaller codebook than quantizing the channel itself. When the channel is correlated in time (or in frequency, e.g., across different tones in OFDM systems), the correlation can be used to considerably reduce the feedback requirement without loss in performance. In comparison to single-resolution codebook, the multi-resolution codebook achieves the same performance using less feedback bits, achieves better performance with the same feedback bits, and has about the same computational complexity and slightly higher memory requirement. Based on the simulation results, for various number of codebook sizes, precoding schemes based on the multi-resolution codebook considerably outperforms the ones based on the single-resolution codebook by using the same or reduced feedback load. Moreover, the complexity and memory requirement of such multi-resolution codebook precoding schemes is comparable with those of the conventional single-resolution codebook.

BRIEF DESCRIPTION OF THE DRAWINGS

FIG. 5C shows exemplary processes for generating high resolution multi-resolution codebooks.

DESCRIPTION

Figure 1:
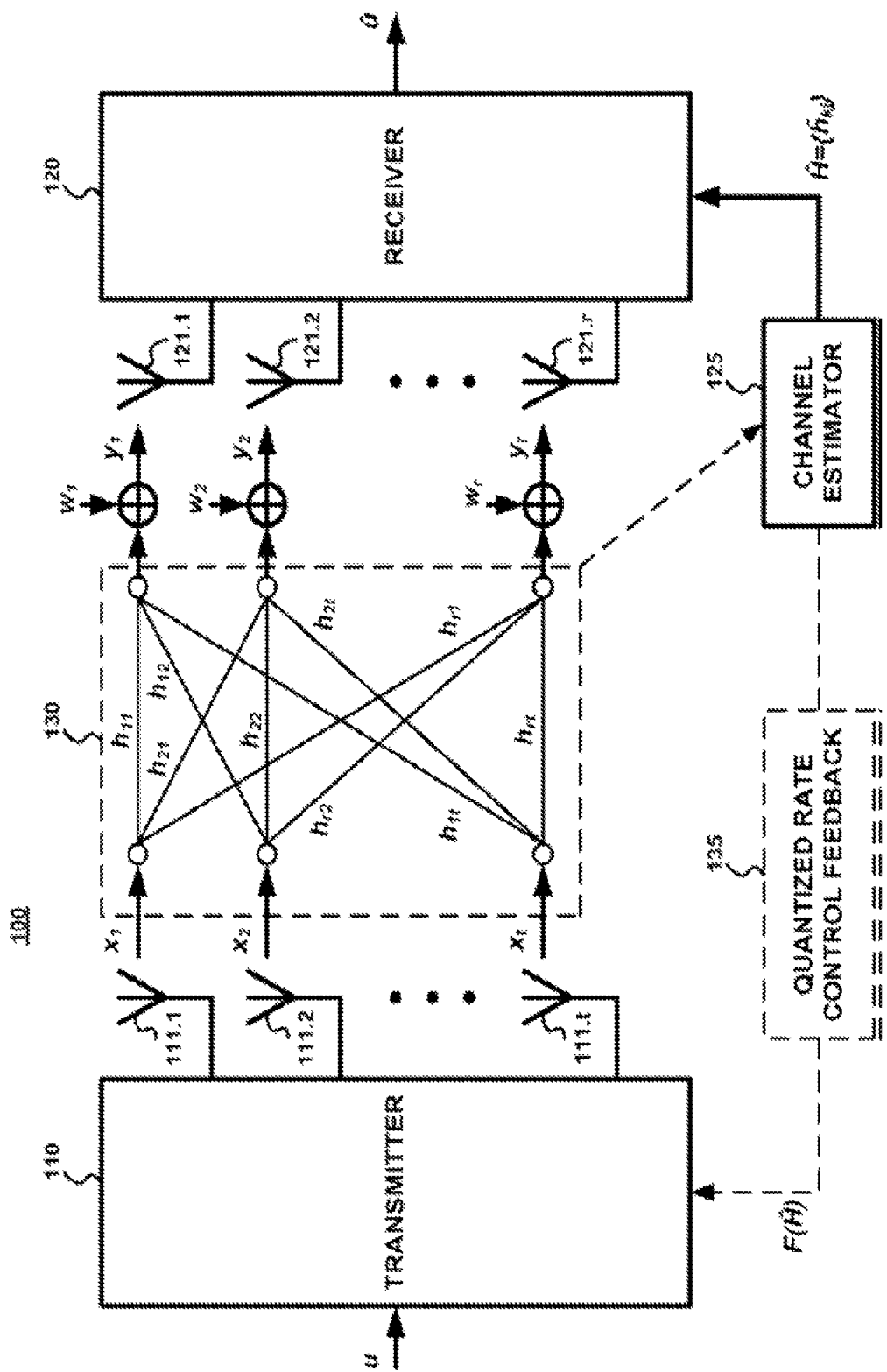
FIG. 1 shows a downlink multiuser MIMO system with $N_T$ transmit-antennas at the BS and $N_R$ receive antennas at MS.

FIG. 1 shows a downlink multiuser MIMO system with $N_T$ transmit-antennas at the BS and $N_R$ receive antennas at MS. An exemplary multiple-antenna communication system 100 with a multi-level precoding codebook is schematically shown in FIG. 1. A transmitter 110 transmits from t transmitting antennas 111.1-111.t over a fading channel 130 to r receiving antennas 121.1-121.r coupled to a receiver 120. A channel estimator 125 provides an estimate of the channel 130 to the receiver 120. The channel estimate is also quantized and provided to the transmitter 110 via a quantized rate control feedback channel 135.

In systems that employ beamforming such as the MIMO systems, the beamforming matrix (referred to herein as a codeword) generated in response to perceived channel conditions is computed and quantized at the receiver first, and then is provided to the source transmitter (e.g., via feedback). A conventional approach to reduce the overhead associated with this feedback is to provide matrix codebook(s) at each of the transmitter and the receiver, each of the codebook(s) comprising a plurality, or set, of potential beamforming matrixes that may be used depending on the channel conditions perceived at the receiver. When the receiver has identified the appropriate matrix codebook(s), the receiver will typically feed back only an index (instead of the actual matrix entries) that points to the appropriate codeword in the codebook(s) stored at the transmitter.

The baseband fading channel linking the $i^{th}$ transmit to the $p^{th}$ receive antenna can be modeled as a finite impulse response (FIR) filter with L taps $$h_{ip} = \sum_{l=1}^{L} \alpha_{ip}(l)\delta(t - \tau_{ip}(l)), \ i = 1, \ldots, N_T, \ p = 1, \ldots, N_R, \quad (1)$$

where $\alpha_{ip}(l)$ is the complex gain and $\tau_{ip}(l)$ is the delay of the $l^{th}$ path. In this system, OFDM is employed to convert the underlying frequency-selective channels to a set of $M_T$ narrowband tones. Thus, the equivalent complex baseband model for the $c^{th}$ channel corresponding to the $c^{th}$ subcarrier can be expressed as $$y_c\sqrt{P/N_T}H_cx_c+w_c, \ c=1,\ldots, M_T, \quad (2)$$

where $x_c$ is the $N_T \times 1$ transmitted signal vector, $H_c$ is the $N_R \times N_T$ channel matrix, $w_c : \mathcal{N}_c(0,1)$ is a circularly symmetric additive white complex Gaussian noise vector, and $y_c$ is the $N_R \times 1$ received signal vector. Using (1), the frequency response $H_c$ of the MIMO channel at the $c^{th}$ subcarrier is given by $$(H_c)_{ip} = \sum_{l=1}^{L} h_{ip}(lT_s)e^{-j2\pi l c/M_T}; \sum_{l=1}^{L} \alpha_{ip}(l)e^{-j2\pi c\tau_{ij}/T_s} \quad (3)$$

where $T_s$ and $\Delta f=1/T_s$ are the OFDM symbol period and the subcarrier frequency separation, respectively. A block fading channel model is used in which the channel remains constant during the transmission of each packet (or codeword of length T) and it changes independently from one block to another. The distributions of $\{\alpha_{ip}(l),\tau_{ij}(l)\}$ in (1) are modeled according to spatial channel models as known to those skilled in the art. To simplify the analysis, $\mathbb{E}[x^*_c x_c] \leq 1$ in (2) and the average transmit power on $c^{th}$ subcarrier in an OFDM block (denoted by P) is independent of the number of transmit antennas.

The system maximizes the sum-rate throughput which is usually the primary goal in downlink transmissions. In this embodiment, (1) the channel is known at the receiver perfectly; (2) the quantized channel state for each user is provided to the transmitter via a feedback link of limited rate; and (3) only linear precoding is allowed at the BS. The feedback link is assumed to be error-free and has zero-delay.

In order to minimize the feedback rate, the quantized channel state information is fed back for a group of adjacent OFDM tones, referred to as a resource block (RB), and only one precoder is used for each RB. Such per RB precoding can be justified for systems where the number of tones is much larger than the number of multi-paths, i.e., $M_T \gg L$. In such cases, the optimal precoders for adjacent OFDM tones are very close and usually identical considering the finite (coarse) precision of the precoding codebook. The system can have $M_B$ resource blocks, each consisting of $M_D/M_B$ adjacent OFDM tones, where $M_D$ OFDM tones are used for the data transmission and the remaining $M_T$-$M_D$ OFDM tones are reserved for transmitting the control and signaling information.

The feedback information from MS consists of three parts: (1) The precoding rank $r \leq N_T$ which is the number of independent streams that can be transmitted; (2) the precoder matrix index (PMI) from a predesigned codebook; and (3) the CQI that represents the signal-to-interference-plus-noise-ratio (SINK) for each stream.

Based on the quantized feedback received from the MSs, the BS then schedules the appropriate MS for transmission in each RB and chooses a precoder which is an $N_T \times r$ matrix $Q_n$ from a predesigned precoding codebook Q. The transmitted signal vector is then obtained by precoding r coded QAM symbols $u=[u_1, u_2, \ldots, u_r]$, i.e., $x_n=Q_n u_n$. The outer code used in this embodiment is the IEEE 802.16e convolutional turbo code (CTC) and for ease of exposition only one codeword is transmitted to a scheduled MS by coding across all the tones assigned to that MS. The design of the precoding codebook Q is discussed below. For a practical system the performance of the precoder selection algorithm may be enhanced by considering the receiver structure (e.g., LMMSE or SIC) and calculating the achievable rate accordingly.

To further optimize the feedback load, the system can provide feedback for the set of M adjacent resource blocks (RBs) by using a multi-resolution codebook. In this embodiment, a low-resolution codebook can be used to find an precoder index which is optimal for all RBs. Then, the system provides a resolution information for each RB by using high-resolution codebook. If a nested multi-resolution codebook is used, the system may be further enhanced by applying a successive approach. In this case, the system first finds the low-resolution precoding index for the center RB. Then, a refinement index is provided for the center RB by using high-resolution codebook. Next, the system considers the two adjacent RBs and only calculates the precoder index from high-resolution codebook assuming the low-resolution index for these two blocks are the same as the high-resolution precoder index for the center RB. This procedure is performed successively for the next two adjacent RBs by where for each one the previously calculated precoder index for the adjacent cell is used as the low-resolution index.

The precoding codebook design is discussed next. In conventional codebook design, only one precoder index is fed back for the resource blocks (RBs) and different RBs are treated individually. Such codebook can also be used to report a single precoding index for a group of RBs.

In the following discussion, the subscript c is dropped and H denotes the channel matrix of any subcarrier. For a resource block, the channel matrix of the center tone is used for precoder selection. For a given transmission rank r and B bits of PMI feedback, the codebook design problem is formulated as finding the set $Q=\{Q_1, Q_2, \ldots, Q_{2^B}\}$ of $N_T \times r$ semi-unitary matrices that is a solution to the optimization problem given by $$C = \max_Q \mathbb{E}\left[\max_{Q \in Q} \log\det\left(I + \frac{P}{N_T} HQQ^*H^*\right)\right]. \quad (4)$$

Conventionally, the maximization problem is solved by equivalently minimizing the chordal distance between the dominant right singular vectors of the channel and the corresponding quantized vectors, where the chordal distance is defined as $$d_{chordal}(Q, V) = \frac{1}{\sqrt{2}} \|VV^* - QQ^*\|_F = \sqrt{N_T - \|V^*Q\|_F^2}. \quad (5)$$

and UDV* is the partial SVD of H obtained by retaining only the r right singular vectors that correspond to the r largest singular values of H. Other distance metric such as Fubini-study metric and p-metric defined between the subspaces V and Q on the Grassmanian manifold $G(N_T, r)$ may also be used.

If a single-resolution codebook is used, the precoder Q for the channel H is obtained from the codebook Q such that logdet $$\left(I + \frac{P}{N_T} HQQ^*H^*\right)$$

is maximized. This capacity measure may be modified accordingly depending on the type of the receiver structure, e.g., if LMMSE is used.

The preferred embodiment uses multi-resolution codebook, where for a group of adjacent RBs, the precoder selection process first selects a common precoder index from a low-resolution codebook and then for each RBs within the group a high-resolution codebook is used to fine tune the precoders for each RB. Although the concept of multi-resolution codebook may be extended to multiple level of codebook resolution, the following discussion focuses on the multi-resolution codebooks with only two resolution levels: the low-resolution and the high-resolution. By using such multi-resolution codebook similar performance can be achieved with lower feedback load in comparison to a system using a single-resolution codebook. Furthermore, both single-resolution or multi-resolution require almost similar memory to store the codebooks and the complexity of the precoder selection using either of the codebooks is also comparable.

Figure 2A:
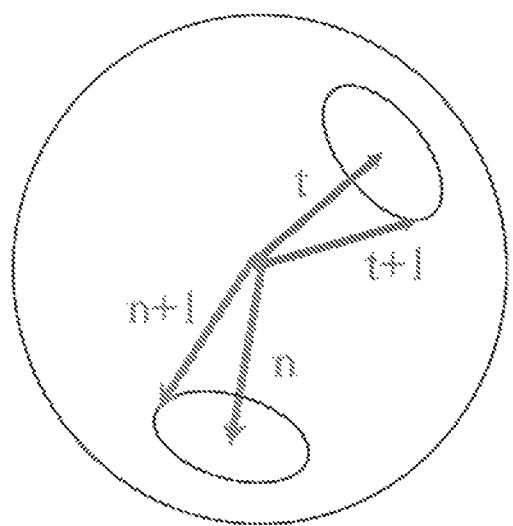
FIG. 2A shows an exemplary diagram illustrating a precoder as a vector and the spacing of precoders as a sphere.

FIG. 2A shows an exemplary diagram illustrating a precoder as a vector and the spacing of precoders as a sphere. This embodiment has $N_T \times N_R$ MIMO channels. The space of all precoders is of size $N_T \times K$, $K \leq N_R$ with a proper distance metric defined on it. The time correlation is at time t, t+1, while the frequency of correlation is the resource block n, n+1. The optimal precoders for two channel realizations that highly correlated are almost similar or very close (with respect to the distance metric).

Figure 2B:
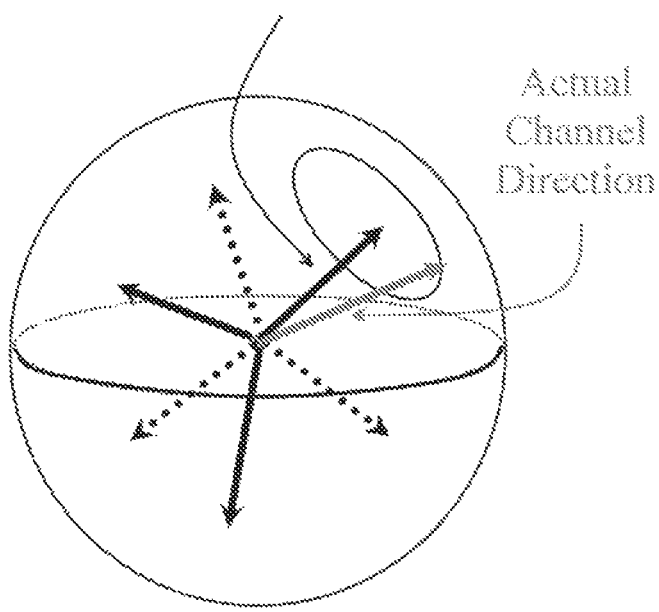
FIG. 2B shows an exemplary quantized codebook.

FIG. 2B shows an exemplary quantized codebook. In this example, six precoders are selected as the possible quantization codebook. Solid lines 202 show the vector in front of the sphere, while dotted lines 204 are in the back of the sphere. Line 206 shows the actual direction, while line 208 covering space 210 is the quantized direction. In this example, instead of the actual channel direction, only the index of the closest precoder is fed back. Thus, for any lines that traverse the space 210, the quantized direction is the same, line 208.

Figure 3A:
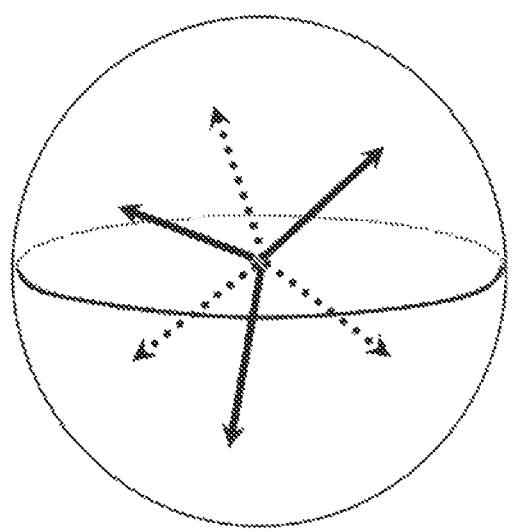
FIGS. 3A-3B show phases of generating an exemplary multi-level resolution codebook.
Figure 3B:
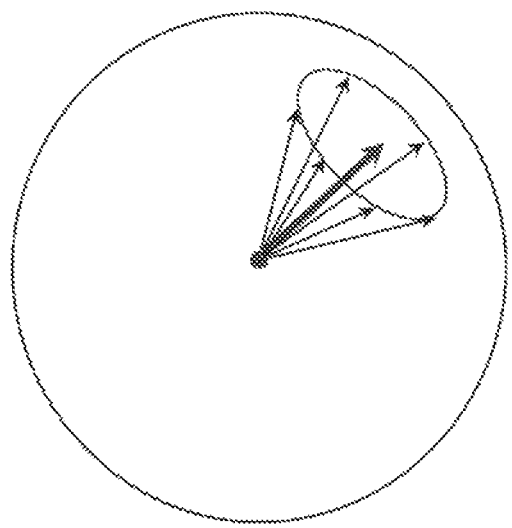

FIGS. 3A-3B show phases of generating an exemplary multi-level resolution codebook. FIG. 3A illustrates the first level resolution codebook, while FIG. 3B illustrates the second level resolution codebook. As shown in FIG. 3B, a set of 6 precoders exist in the vicinity of a given precoder on the sphere. The second level resolution codebook of FIG. 3B can be obtained in several ways. For example, individual optimization can be performed on the second level codebook entries for each vector in the first level codebook. In another method, the system can obtain second level codebooks as a transformation (e.g., unitary rotation) of a single codebook (average performance optimization).

Figure 4:
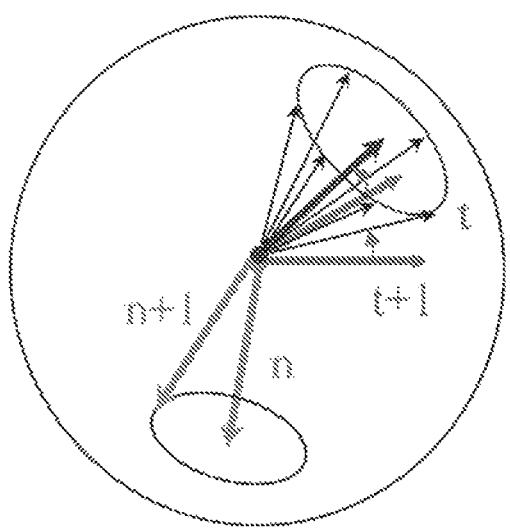
FIG. 4 illustrates an application of the multi-resolution codebook to provide better quantization without increasing the feedback load.

In one embodiment, precoding based on Multi-Resolution codebook can be done. FIG. 4 illustrates two actual channel directions at time t and t+1. If the channel directions are close, the channel direction at time t+1 can be quantized by using the second resolution codebook. The second resolution codebook provides better quantization without increasing the feedback load. The same concept can be used for the quantization of two adjacent resource block n, n+1, in either frequency or time.

In a multi-resolution codebook, the codebook $Q=\{Q_1, Q_2, \ldots, Q_q\}$ consists of q codebooks where the codebook $Q_{i+1}$ is used to add more resolution to the prior set of codebooks $Q_1, \ldots, Q_i$. By using a multi-resolution codebook, finding an optimal precoder for a given channel realization H is performed as follows. First, the optimal precoder $Q_1(H) \in Q_1$ is determined for a given channel realization H. Then, the optimal precoder $Q_2(H, Q_1) \in Q_2$ is determined that depends both on the previous precoder $Q_1$ and the channel matrix H. Depending on the required resolution, this action is successively performed to find the precoder $Q_i(H, Q_1, \ldots, Q_{i-1}) \in Q_i$, $i \leq q$.

In one embodiment, the multi-resolution codebook is optimized based on the channel statistics. In general, different resolution may be optimized for different channel statistics. For example, in an OFDM systems, the first codebook $Q_1$ may be optimized by considering the statistics of the center tone in any RBs, and the second codebook $Q_2$ may be optimized by considering the statistics of the adjacent RBs as well, and so on for the higher resolution codebooks To simplify the discussion, the following discussion assumes that the system uses q=2 and uses only one low-resolution codebook $Q_1$ and one high-resolution codebook $Q_2$. Two examples of the multi-resolution codebook designs are discussed: the multi-resolution codebook based on partitioning and the multi-resolution codebook based on the unitary rotation.

Figure 5A:
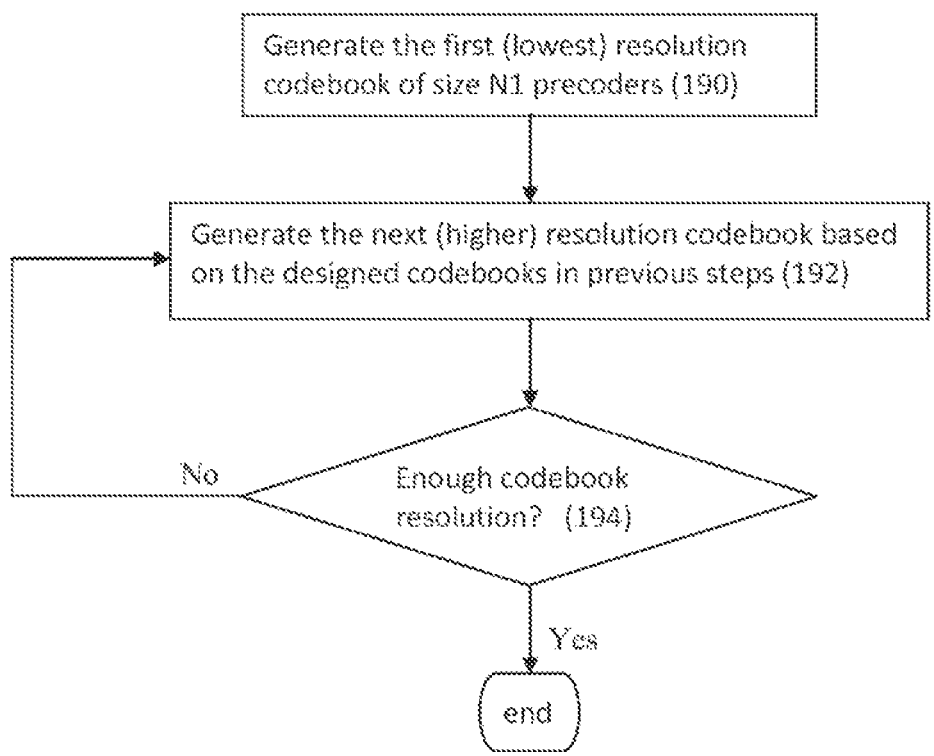
FIG. 5A shows an exemplary multi-resolution codebook generation process.

FIG. 5A shows an exemplary multi-resolution codebook generation process. The process starts by generating low resolution codebook(s) of size N1 pre-coders (190). Next, the process generates high resolution codebook(s) based on the low resolution codebook(s) previously designed (192). The process checks the resolution of the resulting codebook(s) is acceptable (194). If not, the process loops back to 192 to refine the codebook resolution and alternatively if done, the process exits.

In another implementation, a multi-resolution codebook can be generated by selecting a common precoder index from a low resolution codebook for a group of adjacent resource blocks (RB)s. Next, for each RB within the group, the process selects a high-resolution codebook to fine-tune each RB precoder and generates feedback based on the multi-resolution codebook by quantizing channel state variations. The process can then perform pre-coding based on the multi-resolution codebook.

Figure 5B:
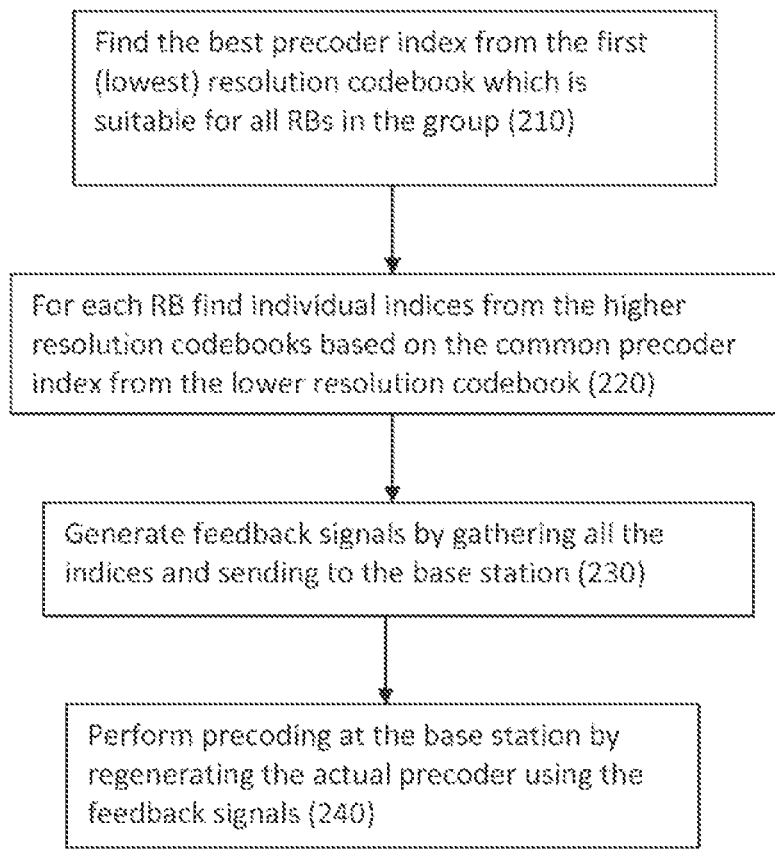
FIG. 5B shows an exemplary process for applying the multi-generation codebook.

FIG. 5B shows an exemplary process for applying the multi-generation codebook to perform precoding. First, the process finds the best precoder index from the low resolution codebook which is suitable for all RBs in the group (210). Next, for each RB, the process finds individual indices from the high resolution codebook(s) based on the common precoder index from the low resolution codebook(s) (220). Feedback signals are generated by gathering all indices and sent to the base station (230). The process performs precoding at the base station by regenerating the actual precoder using the feedback signals (240).

FIG. 5C shows exemplary processes for generating high resolution multi-resolution codebooks. In one embodiment, the high resolution code books can be individually optimized (250). In this embodiment, the process generates high resolution codebooks by directly optimizing each individual codebook for each precoder entry in a low resolution codebook (252).

In a second embodiment, the process individually optimizes the codebooks by partitioning (260). The process of the second embodiment designs a high resolution codebook C of size N1×N2× . . . ×Nk, where k is the number of resolution levels and Nj is the size of the jth codebook (262). The process then finds N1 precoders in C which have the largest minimum distance between each pair. The process generates the first level precoder and removes selected precoders m from C (264). Next, j is set to a predetermined value (266). Next, for each precoder entry of the low resolution codebook, the process finds the closest entries from the remaining precoders in C. The process generates the jth codebook and removes the selected precoders from C (268). Next, the process checks if the end is reached (270) and if not, increments j (272) and loops back to 268.

In a third embodiment, the process jointly determines optimized codebook(s) (280). The process selects a set of transformations fi,j which convert a precoder to another precoder from the set of all possible precoders (282). For example fi,j could be multiplication of the original precoder by a unitary matrix Fi,j from the left. The j'th resolution codebook by then consists of all the output of fi,j functions for all precoders of the previous resolution level as an input (284). The process optimizes the set of fi,j functions which maximizes the joint (average) minimum distance for the j'th resolution codebook (286) and this is successively repeated for all resolution levels (288).

In yet another embodiment, the high resolution codebook can be a set of precoders in the vicinity of a given precoder on a sphere. The second level resolution codebook can be generated by individually optimizing the second level codebook entries for each precoder, which can be a vector or a semi-unitary matrix, in the low resolution codebook. Alternatively, the high resolution codebook can be generated by obtaining second level codebooks as a transformation of a single codebook. Alternatively, the process can generate the high resolution codebook by obtaining second level codebooks as a unitary rotation of an average performance optimization.

The operations of embodiments of FIGS. 5A-5C are discussed next.

Multi-Resolution Codebook Based on Partitioning

For a simple construction of a multi-resolution codebook, a partitioning concept is used. If $\mathcal{K}$ denotes a single-resolution codebook of size $|\mathcal{K}|$ which has designed to meet the highest required resolution, to generate a multi-resolution codebook, the system first finds a low-resolution codebook $Q_1$ by taking $|Q_1|$ elements form $\mathcal{K}$ which have the maximum minimum distance between each two elements. For each element $Q_i$ of the codebook $Q_1$, the system then finds the set of closest $|\mathcal{K}|/|Q_1|$ elements from $\mathcal{K}$ and denotes it by $Q_{2i}$. The elements are chosen such that each element of $\mathcal{K}$ belongs to one and only one $Q_{2i}$. The set $Q_2=\{Q_{21}, Q_{22}, \ldots, Q_{2,|Q_1|}\}$ eventually includes all the elements of $\mathcal{K}$ but each element is doubly indexed, i.e., an index corresponding to a unique element of $Q_1$ and an index which enumerate the possible choices of the precoders in $Q_2$ for a given precoder index in $Q_1$. Thus, the set $Q_2$ is divided into $|Q_1|$ partitions such that each partition $Q_{2i}$ has equal number of elements. As such partitioning is not unique because the set of closest elements depends on the order of assignment of the elements of $\mathcal{K}$ to each partition, an optimization may be performed to maximize the overall codebook performance by taking the best partitioning.

An alternative approach to design a multi-resolution codebook is to first design a low-resolution codebook $Q_1$ directly. Next, for each entry of the codebook, say $Q_i$, the set of channel conditions for which this entry is chosen is determined as $\mathcal{H}(Q_i)$. Then, an optimal codebook $Q_{2i}$ is found using only the channel conditions in $\mathcal{H}(Q_i)$, i.e., solving the optimization problem (4) where the expectation is taken over $\mathcal{H}(Q_i)$. The size of $Q_{2i}$ is chosen to meed the desired resolution level. The codebook $Q_2=\{Q_{21}, Q_{22}, \ldots, Q_{2,|Q_1|}\}$ is then constructed as the set of all such designed codebooks.

In some cases, it is beneficial to design a nested multi-resolution codebook. The codebook $Q=(Q_1, Q_2)$ is called nested multi-resolution codebook if and only if $$\forall i, 1 \leq i \leq |Q_1| : Q_{2i} \subset Q_1 \quad (6)$$

In one embodiment, the system takes the low-resolution codebook $Q_1=\mathcal{K}$ and then finds the set of $Q_{2i} \subset \mathcal{K}$ as the $|Q_{2i}|$ closest neighbors of each elements $Q_i \in Q_1$ to construct the high-resolution codebook $Q_2=\{Q_{2i}\}_{i=1}^{|Q_1|}$. In this case, the high-resolution codebook does not increase the resolution for the original RB, but successive application of this codebook for the adjacent RBs considerably improves the resolution of the precoder matrix for the adjacent RBs.

The representation of the latter codebook constructions requires storing $|Q_1|$ and $|Q_2|$ precoders and a set of indices to denote the partitioning in $Q_2$. Also, the former codebook construction needs storing $|\mathcal{K}|$ precoders plus two set of indices to represent $Q_1$ and $Q_2$ codebooks.

Multi-Resolution Codebook Based on Transformation (e.g., Unitary Rotation)

To simplify the codebook storage, the system can use functions, $f_i$, $1 \leq i \leq |Q_{2k}|$ which convert each element $Q_1 \in Q_1$ to a new precoder of the same size. An example of such function is a unitary rotation, i.e., $Q_2 = f_i(Q_1) = F_i Q_1$. For the precoder of size $N_T \times r$, the unitary rotations $F_i$ are of size $N_T \times N_T$. Using such transformation, the system needs to store only $|Q_{2k}|$ unitary matrices that is constant irrespective of k to generate the entire high-resolution codebook $Q_2$. Thus, the average performance of such generated codebook over all entries of the codebook $Q_1$ should be considered in the design of the functions $f_i$. More specifically, we divide the set of all the channel realizations into $|Q_1|$ partitions $\mathcal{H}(Q_i), 1 \leq i \leq |Q_1|$ where the precoder $Q_i \in Q_1$ is the optimal precoder.

Thus the codebook design problem is given by $$\max_{\mathcal{F}} \sum_{i=1}^{|Q_1|} \left| \mathbb{E}_{\mathcal{H}(Q_i)} \left[ \max_{F \in \mathcal{F}} \log\det\left(I + \frac{P}{N_T} HFQ_i Q_i^* F^* H^*\right) \right] \right|. \quad (7)$$

where $\mathcal{F} = \{F_1, F_2, \ldots\}$ is the set of unitary matrices that equivalently represent the codebook $Q_2$.

Simulation Results

First, the system setup and the codebooks used for the simulations are discussed. The simulated system uses a BS with 4 transmit antennas and a MS with 2 receive antennas. Thus, the precoding schemes use two codebooks of rank 1 and rank 2 with the same size. The rank-1 and rank-2 codebooks for the single-resolution codebook are obtained from IEEE802.16e. An extra feedback bit is also used to feedback the rank of the selected precoder. The PMI of size 3, 4, 5, or 6 bits represents 8, 16, 32, or 64 choices for precoders per rank. The single-resolution codebook of size $2^B$ is denoted by $\mathcal{C}^{(B)}$. The channel model and the other important system parameters are summarized in Table 1.

TABLE 1

Simulation parameters and channel model.

| Parameter | Assumption |
|---|---|
| Access | OFDM |
| RF carier frequency | 2.0 GHz |
| Bandwidth | 10.0 MHz |
| Number of paths (Multi-path model) | 6 |
| Sub-carrier spacing | 10.9375 kHx |
| Sampling frequency | 11.2 MHz |
| Number of occupied sub-carriers | 720 |
| Number of OFDM symbols/frame | 47 |
| Frame duration | 5 ms |
| Number of subcarriers per slot (RB) | 24 |
| CP length | (1/8)* 102.86 micro second |
| FFT point | 1024 |
| Number of antennas at BS | 4 |
| Number of antennas at MS | 2 |
| Codebook size (in bits) | 3, 4, 5, 6 bits for low-resolution, 3 bits for high resolution |
| Number of the resource blocks (M) | 3, 7, 11 |
| Channel models | SCM channel model case 1A |
| Channel estimation | Ideal channel estimation |
| MCS | 4, 16 and 64 QAM, code rates 1/2, 2/3, 3/4 and 5/6 |
| Quantization codebook | Single-resolution: IEEE802.16e, Multi-resolution: Design |

For the multi-resolution codebook, for each codebook $\mathcal{C}^{(B)}$, the first set of multi-resolution codebooks $\mathcal{M}^{(B)}$ is obtained by taking the first resolution codebook $\mathcal{M}_1^{(B)} = \mathcal{C}^{(B)}$ and designing a 3-bit unitary rotation codebook $\mathcal{F}^{(B)}$ which equivalently represents $\mathcal{M}_2^{(B)}$.

The second set of multi-resolution codebook $\mathcal{N}^{(B)}$, $B \geq 5$ is designed by using the partitioning approach. We first find $\mathcal{N}_1^{(B)}$ of size $2^{(B-3)}$ by taking the elements from $\mathcal{C}^{(B)}$ which have the maximum minimum distance from each other. Then, the set $\mathcal{C}^{(B)}$ is partitioned into $2^{(B-3)}$ where each partition contains the set of 8 closest neighbors for each codebook entry $Q \in \mathcal{N}_1^{(B)}$. Thus, $\mathcal{N}_2^{(B)}$ is the set of $\mathcal{C}^{(B)}$ along with the acquired partitioning.

The third set of multi-resolution codebooks $\mathcal{O}^{(B)}$ is also designed by using the partitioning approach. Here, we take $\mathcal{O}^{(B)} = \mathcal{C}^{(B)}$ and then the set of 8 closest neighbor of each codebook entry $Q_i \in \mathcal{N}_1^{(B)}$ is determined to obtain $\mathcal{O}_{2i}^{(B)}$, and $\mathcal{O}_2^{(B)} = \{\mathcal{O}_{21}^{(B)}, \mathcal{O}_{21}^{(B)}, \ldots, \mathcal{O}_{2,|C^{(B)}|}\}$.

As a point of comparison, the multi-resolution codebook is designed such that only 3 bits is required to represent the high-resolution information about the precoder in all mentioned cases. Thus, the value B in the codebooks $\mathcal{C}^{(B)}$, $\mathcal{M}^{(B)}$, and $\mathcal{O}^{(B)}$ only refers to the size of low-resolution codebook. However, the size of low-resolution codebook in $\mathcal{N}^{(B)}$ is B−3 bits.

The throughput performances of the different codebooks are compared through several link level simulations. The precoding is used over M resource blocks of size 24 subcarrier each. When a single-resolution codebook $\mathcal{C}^{(B)}$ is used, the precoder index for each resource block is found individually and total of 6M bits is fed back to the BS. However, when the either of the codebooks $\mathcal{M}^{(B)}$, $\mathcal{N}^{(B)}$, and $\mathcal{O}^{(B)}$ is used, the precoding requires B bits for the center resource block and only 3 bits for the rest of M−1 resource blocks, thus, the total number of feedback bits is calculated as 6+3(M−1)=3M+3.

Figure 6:
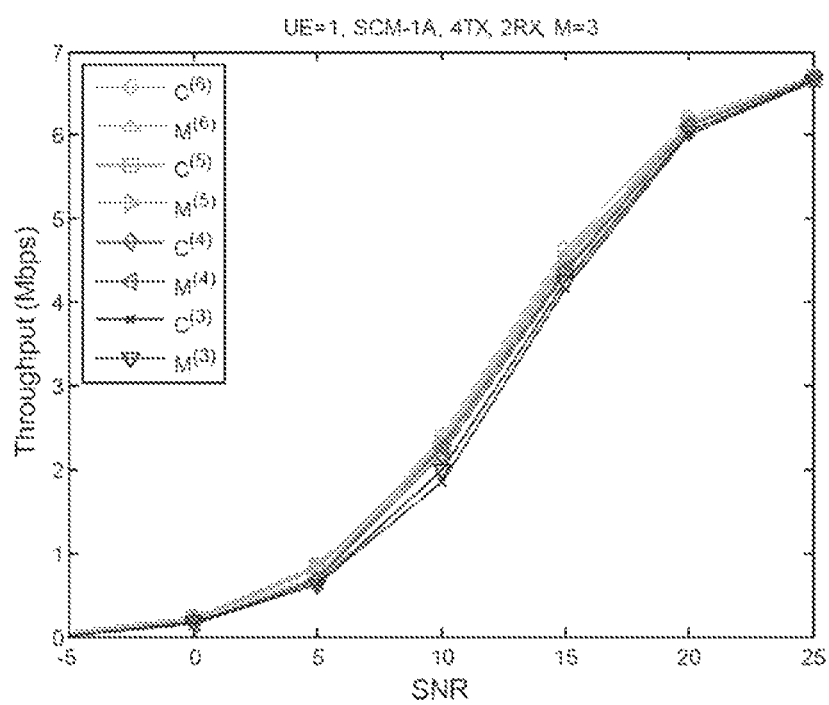
FIG. 6 shows the link level throughput results comparing the single-resolution codebook $\mathcal{C}^{(B)}$ with the multi-resolution codebook $\mathcal{M}^{(B)}$ for various codebook size B.
Figure 7:
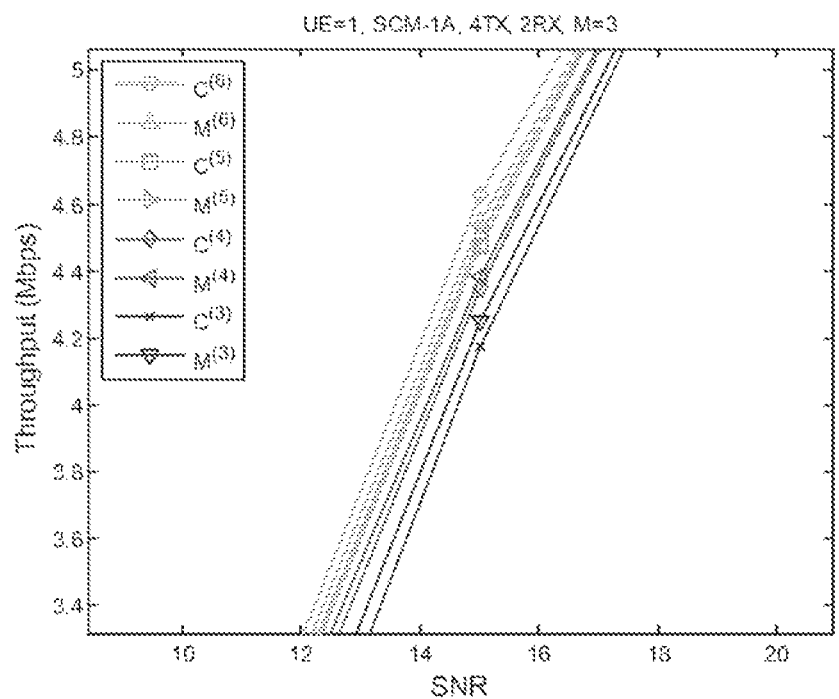
FIGS. 7-11 show the link level throughput results comparing the single-resolution codebook $\mathcal{C}^{(B)}$ with the multi-resolution codebook $\mathcal{M}^{(B)}$ for various codebook size B by increasing the number of resource blocks from M=3 to M=7 and M=11.
Figure 8:
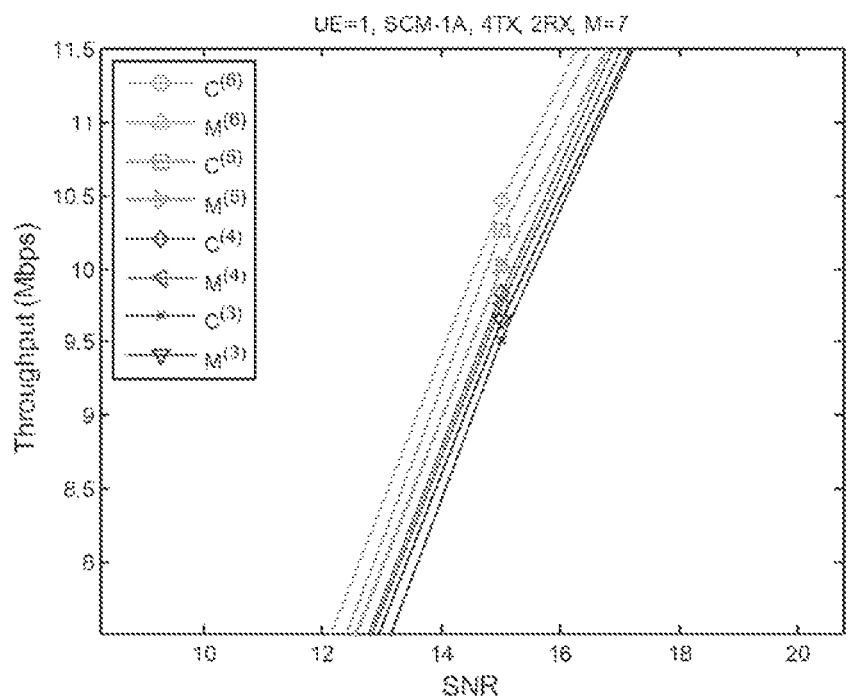
Figure 9:
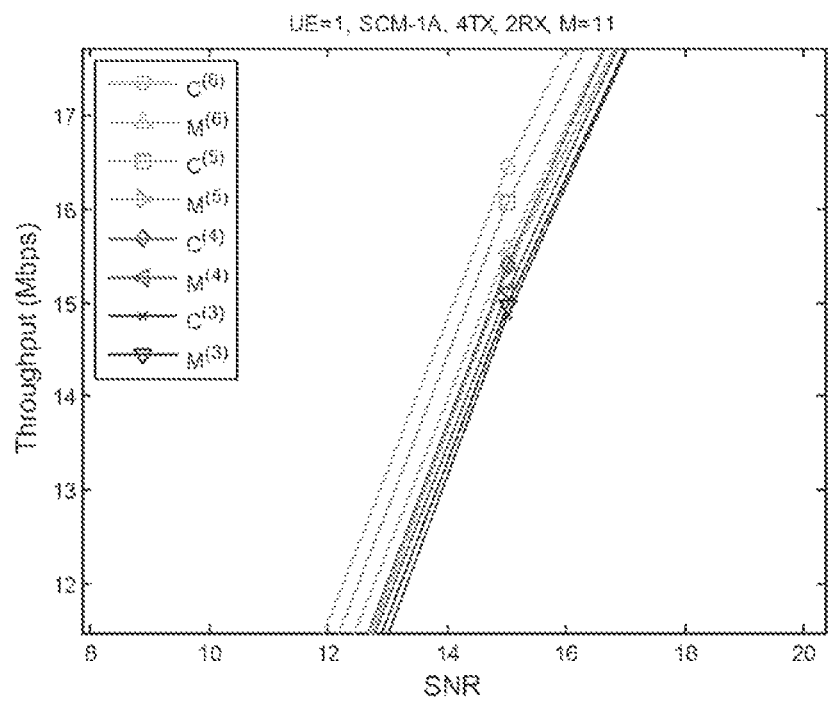

FIG. 6 shows the link level throughput results comparing the single-resolution codebook $\mathcal{C}^{(B)}$ with the multi-resolution codebook $\mathcal{M}^{(B)}$ for various codebook size B. Here, we have used M=3 resource blocks. It is observed that the performance of the multi-resolution codebook is better than that of the single-resolution codebook for B=3, 4, 5 while the feedback load has reduced to 9, 10, 11 from 9, 12, 15 bits. The performance of the multi-resolution codebook $\mathcal{M}^{(6)}$ is, however, slightly lower than that of the single-resolution codebook $\mathcal{C}^{(6)}$. Nonetheless, there is a considerable saving of 6 bits in the feedback load in this case.

Figure 10:
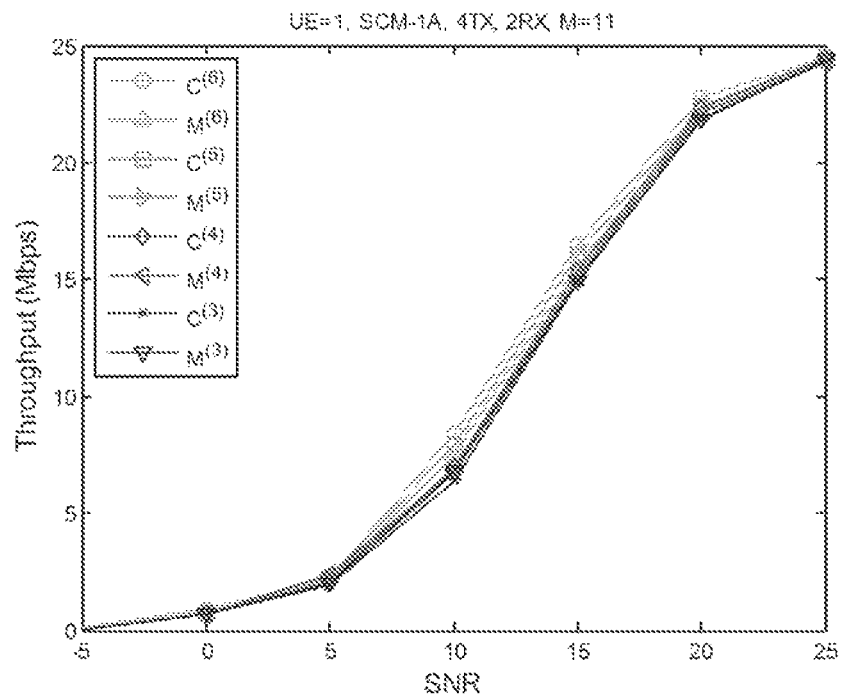
Figure 11:
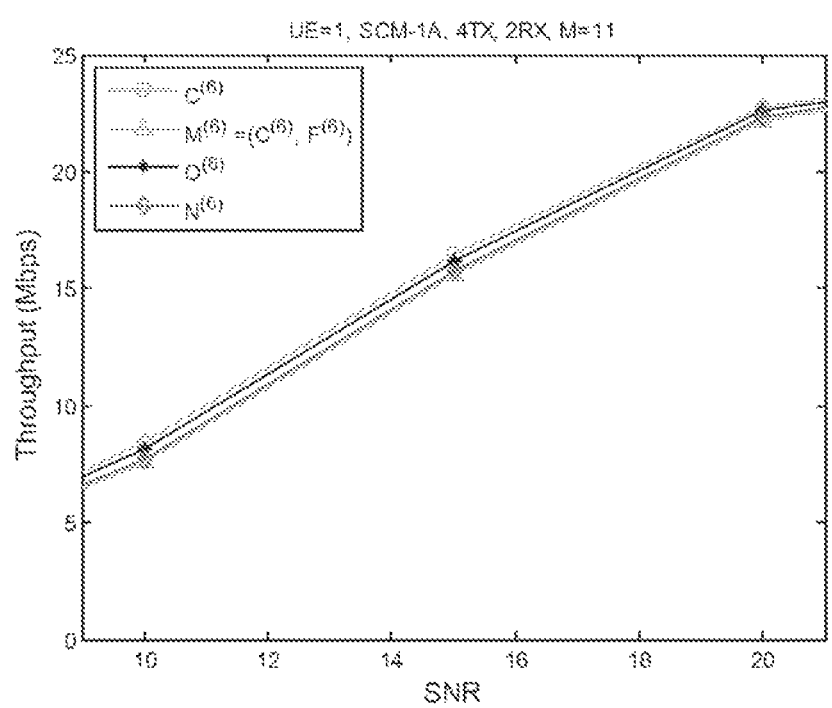

FIGS. 7-11 show the link level throughput results comparing the single-resolution codebook $\mathcal{C}^{(B)}$ with the multi-resolution codebook $\mathcal{M}^{(B)}$ for various codebook size B by increasing the number of resource blocks from M=3 to M=7 and M=11. It is observed that the performance of the multi-resolution codebook starts degrading with respect to that of the single-resolution codebook as the M increases. This is due to the fact that we assume the low-resolution index for all M RBs are the same and only calculate the high-resolution indices for the M−1 blocks adjacent to the center RB. It is observed that for M=7 still the performance of the multi-resolution codebook is better than that of the single-resolution codebook for B=3. However, for the M=11 the multi-resolution codebook $\mathcal{M}^{(B)}$ shows considerable degradation in performance as it is shown in FIGS. 10 and 11. However, one should note that the feedback loads in this case are 36, 35, 34, 33 instead of 66, 55, 44, 33 for B=6, 5, 4, 3, respectively.

FIG. 10 shows the link level throughput results comparing the single-resolution codebook $\mathcal{C}^{(B)}$ with three different design of multi-resolution codebooks, i.e., $\mathcal{M}^{(B)}$, $\mathcal{N}^{(B)}$, and $\mathcal{M}^{(B)}$. In this case we consider M=11 resource blocks and only present the result for the codebook size B=6. It is seen that although the performance of $\mathcal{M}^{(B)}$ is not so appealing, the performance of the multi-resolution codebook $\mathcal{O}^{(B)}$ is comparable with that of the original single-resolution codebook $\mathcal{C}^{(B)}$. The performance of the other multi-resolution codebook $\mathcal{N}^{(B)}$ is somewhere in between that of $\mathcal{M}^{(B)}$ and $\mathcal{O}^{(B)}$. Thus, by proper design of the multi-resolution codebook, it is possible to achieve a performance close to a single-resolution codebook but with much lower feedback load. In this case, the feedback load has been reduced to 36 from 66 that is a significant saving of 30 bits.

In sum, systems that use the multi-resolution codebook provides feedback only the variation in the channel, since typically quantizing the channel variations requires a smaller codebook than quantizing the channel itself. When the channel is correlated in time (or in frequency, e.g., across different tones in OFDM systems), the correlation can be used to considerably reduce the feedback requirement without loss in performance. Multi-resolution codebook can be used for the DL transmission in IEEE802.16m. For various number of codebook sizes, the precoding schemes based on the multi-resolution codebook considerably outperforms the ones based on the single-resolution codebook by using the same or reduced feedback load. Moreover, the complexity and memory requirement of such multi-resolution codebook precoding schemes is comparable with those of the conventional single-resolution codebook.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method implemented in a user equipment used in a wireless communications system for precoding data, comprising:
   transmitting to a base station a low resolution precoder index that is common to a group of resource blocks (RBs); and
   transmitting to the base station a high resolution precoder index for a resource block within the group of RBs,
   wherein the base station determines a precoder using a multi-resolution codebook according to the low resolution precoder index and the high resolution precoder index.

2. The method of claim 1, wherein a channel for the group of RBs is correlated in time or in frequency.

3. The method of claim 1, wherein a channel for the group of RBs is correlated in frequency across different OFDM (orthogonal frequency-division multiplexing) tones.

4. The method of claim 1, wherein the group of RBs are adjacent in time or in frequency.

5. The method of claim 4, wherein the group of RBs are adjacent in frequency over OFDM (orthogonal frequency-division multiplexing) tones.

6. The method of claim 1, wherein the multi-resolution codebook consists of two resolution levels of a first level and a second level.

7. A method implemented in a user equipment used in a wireless communications system for precoding data, comprising:
   receiving data precoded with a precoder from a base station,
   wherein the precoder is determined using a multi-resolution codebook according to a high resolution precoder index for a resource block within a group of resource blocks (RBs) and a low resolution precoder index that is common to the group of RBs.

8. The method of claim 7, wherein a channel for the group of RBs is correlated in time or in frequency.

9. The method of claim 7, wherein a channel for the group of RBs is correlated in frequency across different OFDM (orthogonal frequency-division multiplexing) tones.

10. The method of claim 7, wherein the group of RBs are adjacent in time or in frequency.

11. The method of claim 10, wherein the group of RBs are adjacent in frequency over OFDM (orthogonal frequency-division multiplexing) tones.

12. The method of claim 7, wherein the multi-resolution codebook consists of two resolution levels of a first level and a second level.

13. A wireless communications system for precoding data, comprising:
   a base station; and
   a user equipment to transmit to the base station a high resolution precoder index for a resource block within a group of resource blocks (RBs) and a low resolution precoder index that is common to the group of RBs,
   wherein the base station transmits data precoded with a precoder to the user equipment, and
   wherein the precoder is determined using a multi-resolution codebook according to the low resolution precoder index and the high resolution precoder index.

14. The wireless communications system of claim 13, wherein a channel for the group of RBs is correlated in time or in frequency.

15. The wireless communications system of claim 13, wherein a channel for the group of RBs is correlated in frequency across different OFDM (orthogonal frequency-division multiplexing) tones.

16. The wireless communications system of claim 13, wherein the group of RBs are adjacent in time or in frequency.

17. The wireless communications system of claim 16, wherein the group of RBs are adjacent in frequency over OFDM (orthogonal frequency-division multiplexing) tones.

18. The wireless communications system of claim 13, wherein the multi-resolution codebook consists of two resolution levels of a first level and a second level.

* * * * *